United States Patent
Phillips et al.

[11] B 3,981,391
[45] Sept. 21, 1976

[54] BELT TRACKING SYSTEM FOR A BALER

[75] Inventors: Carmen S. Phillips; Charles D. Mecklin, both of Memphis, Tenn.

[73] Assignee: International Harvester Company, Chicago, Ill.

[22] Filed: Aug. 21, 1974

[21] Appl. No.: 499,352

[44] Published under the second Trial Voluntary Protest Program on January 27, 1976 as document No. B 499,352.

[52] U.S. Cl. ................................ 198/308; 56/341
[51] Int. Cl.² ......................................... B65G 15/62
[58] Field of Search .............. 198/7 R, 7 BL, 8, 187, 198/191, 192 R, 202, 208; 56/341; 74/240, 241

[56] References Cited
UNITED STATES PATENTS

| | | | |
|---|---|---|---|
| 2,480,294 | 8/1949 | Hume | 198/208 |
| 2,568,174 | 9/1951 | Staacke | 198/202 |
| 2,966,065 | 12/1960 | Renner | 198/202 |
| 3,132,785 | 5/1964 | Kunz | 198/202 |
| 3,240,321 | 3/1966 | Lo Presti et al. | 198/202 |
| 3,710,927 | 1/1973 | Alsted | 198/202 |
| 3,722,197 | 3/1973 | Vermeer | 56/341 |

*Primary Examiner*—Evon C. Blunk
*Assistant Examiner*—Joseph E. Valenza
*Attorney, Agent, or Firm*—Neal C. Johnson; Floyd B. Harman

[57] ABSTRACT

A baler adapted to be pulled along the ground to pick up a windrow of hay and roll the hay into a cylindrical bale of substantial size and weight. The bale is formed between a plurality of upper belts and an endless power-driven lower belt which is disposed in upper and lower runs between a forward drive roller and a rear tightener roller. Due to variations in the volume and density of the hay being introduced onto the lower belt, the same is subject to non-uniform loading transversely thereof. This uneven loading creates forces which tend to shift the belt away from the desired centered position in its path of movement. A system of rollers is disposed in rolling engagement with the underside of the lower run of the belt for maintaining the belt in centered relation even though the upper run is subjected to non-uniform loading. The system includes a pair of troughing rollers and a compensating roller successively engaged by the lower run in its path of movement toward the power-driven roller.

9 Claims, 6 Drawing Figures

U.S. Patent  Sept. 21, 1976  Sheet 1 of 3  3,981,391
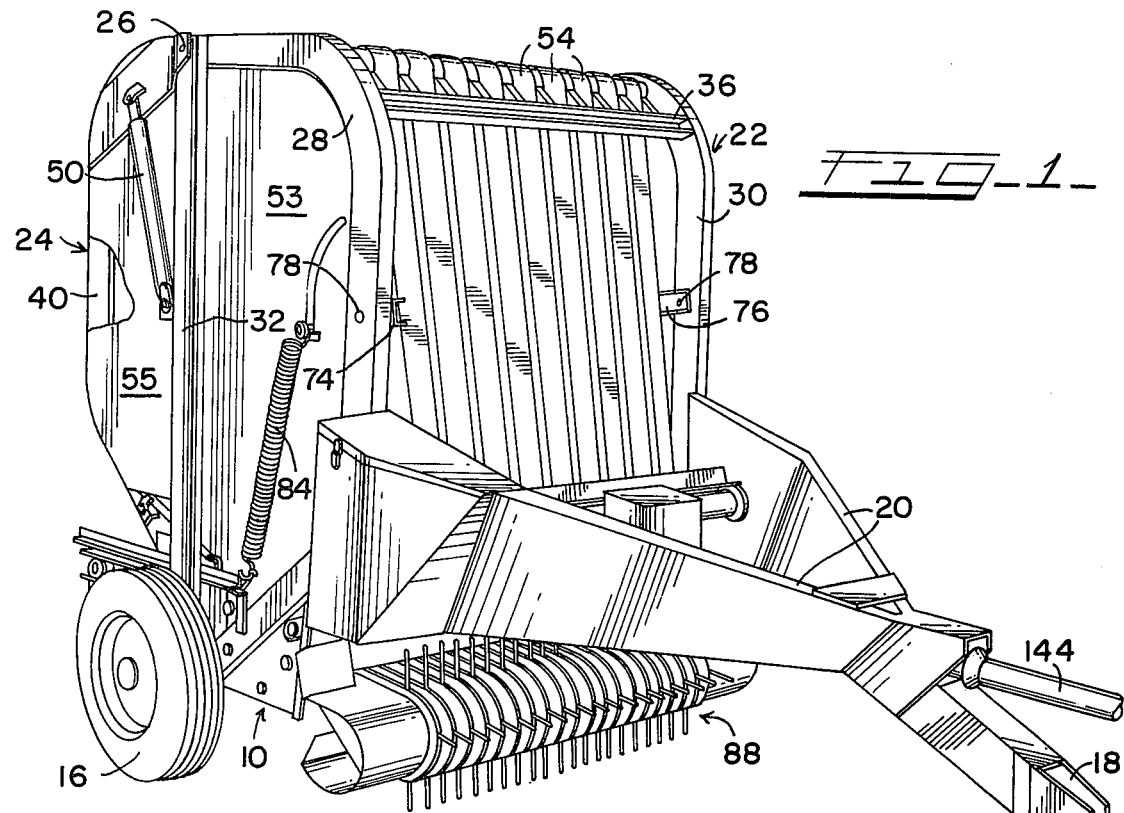
FIG-1-
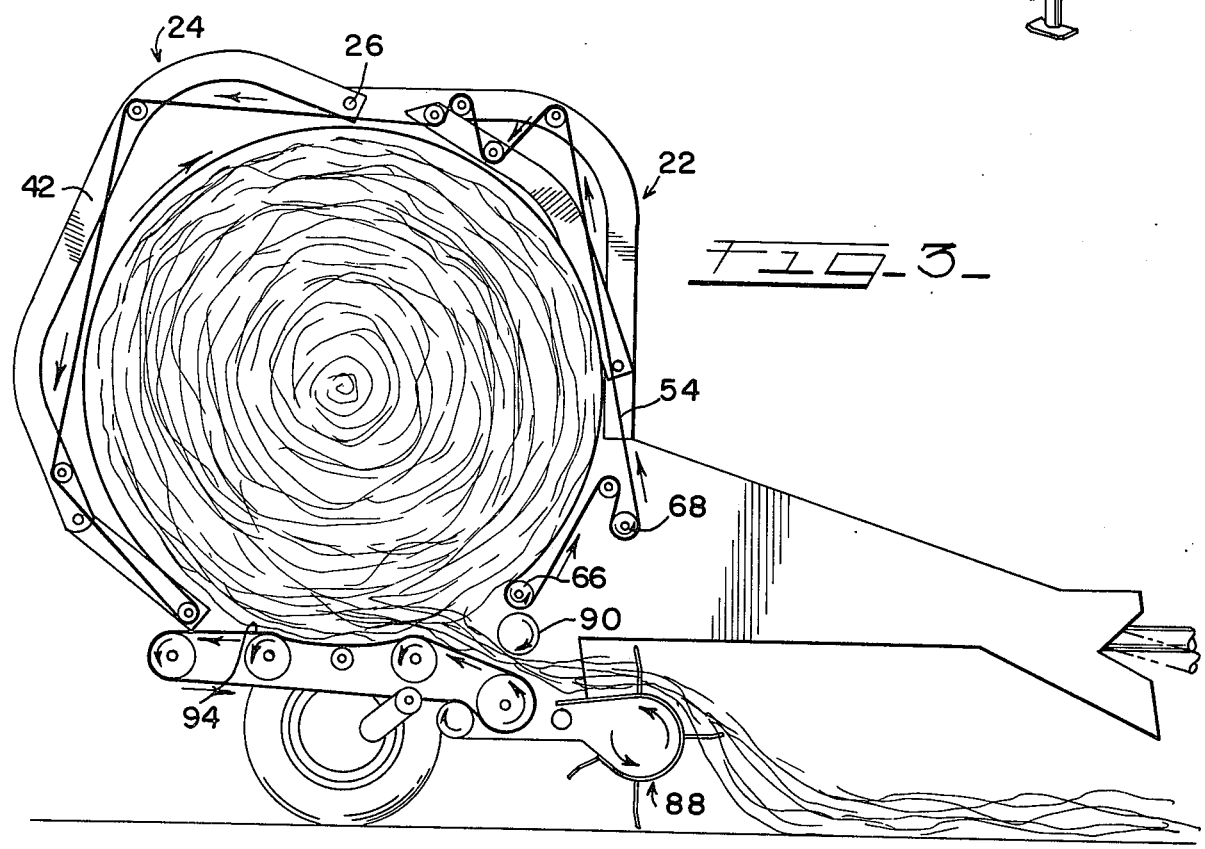
FIG-3-

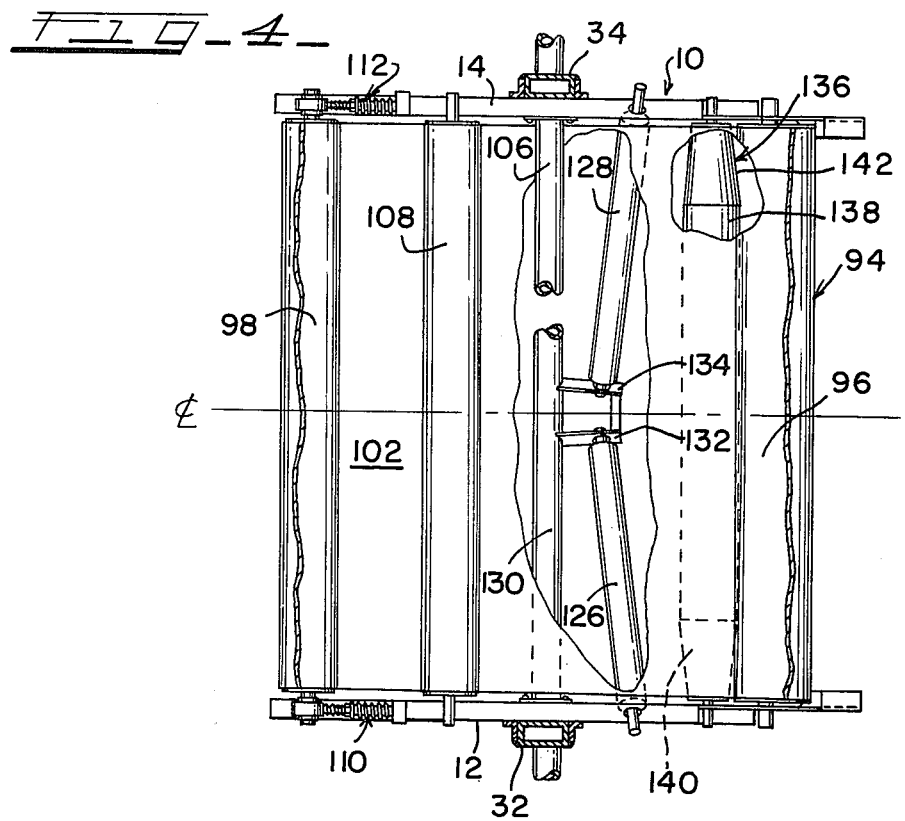
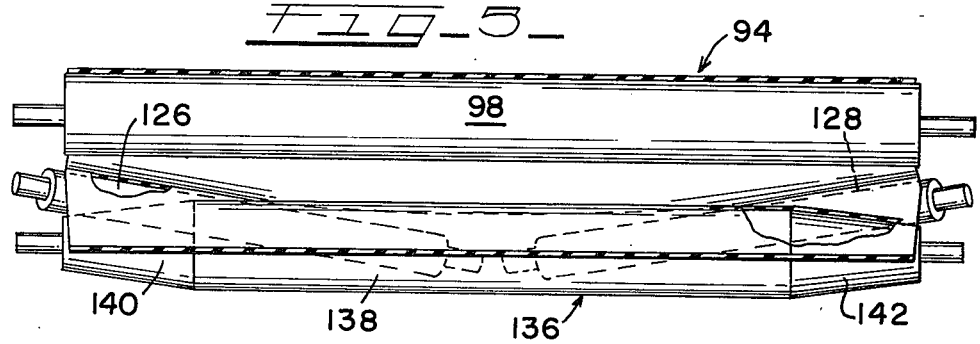
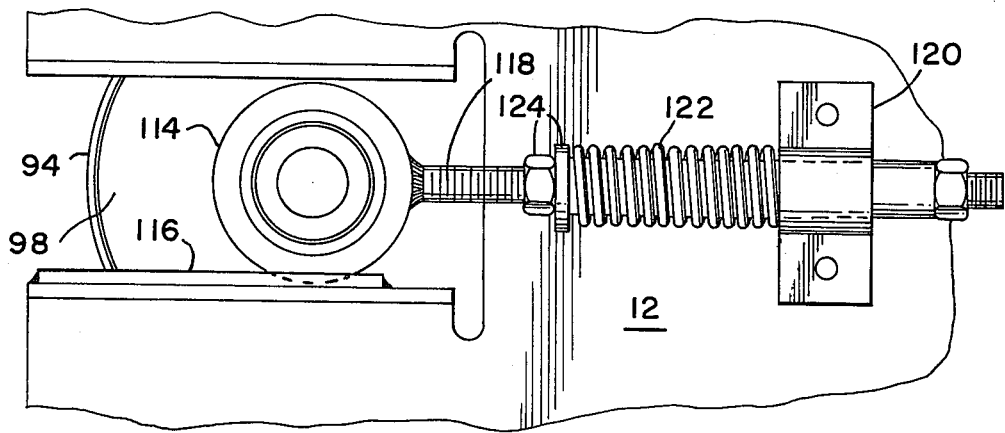

BELT TRACKING SYSTEM FOR A BALER

BACKGROUND OF THE INVENTION

1. Field of the Invention

The invention relates to a supporting and tracking system for an endless belt upon which a cylindrical hay bale is adapted to be formed.

2. Description of the Prior Art

In balers of the type shown in U.S. Pat. No. 3,722,197 a windrow of hay is received on a lower endless belt which is driven oppositely to a plurality of upper belts. The hay is rolled onto itself between the upper and lower belts and is supported on the lower belt throughout the baling process. The lower belt also serves to convey the completed bale out of the baler onto the ground. Since the density and rate of flow of the hay are variable, it is inevitable that the load on the endless belt is not always uniformly applied, particularly as measured across the width (transversely) of the belt. The imposition of non-uniform loads on the moving belt imparts forces having transversely directed components tending to shift the belt away from a centered straight-line path of movement parallel to the baler centerline. This misalignment causes undue wear and premature failure of the belt.

The belt of the type in question is usually short in longitudinal extent relative to its width. As pointed out in U.S. Pat. No. 2,797,794 a problem with such belts is that large forces are required to maintain the belt in proper centered relation. In that patent the solution requires a resiliently restrained swivel-mounted assembly having side rollers 11 and a correction roller 6.

U.S. Pat. No. 2,391,249, 2,896,774, and 3,098,558 show belt-centering structure using swivel-mounted roller assemblies. However, the belts shown in these patents have the upper runs thereof troughed to reduce spillage of the material being conveyed and the belt centering structure is incorporated into the troughing structure.

The basic problem is to provide an effective and inexpensive system adaptable for long term, minimum-maintenance use, particularly in the difficult circumstances provided by field-going operation of a baler.

SUMMARY OF THE INVENTION

The invention provides a tracking and supporting system for an endless drivable belt usable in a baler wherein hay is rolled into a cylindrical bale upon the moving belt. The belt extends between a power drivable roller and another roller in an upper bale-supporting run and a lower return run. The bale-supporting run is subject to non-uniform loading which tends to move or shift the belt away from alignment with a straight-line path of travel. The misalignment may cause undue wear and premature failure of the belt. The tracking and supporting system includes roller means in engagement with the underside of the lower, non-load carrying run for offsetting or opposing the load-induced misalignment to maintain the proper path of travel.

The prior art seems to suggest that belt-centering requires rollers which are supported by some type of swiveling or pivoting arrangement which of course requires bearings of some type with the consequent possibility of wear, adjustment, lubrication, and other maintenance resulting in lost time from operation and higher operation costs.

The tracking and support system of the present invention maintains the belt in proper running alignment on the supporting rollers by an arrangement of rollers which are fixed relative to the supporting framework. Accordingly, swivel or pivoting type structures are eliminated entirely. Moreover, the invention is effective upon a belt which is short in longitudinal extent relative to its width — thus readily providing the large centering forces described in the prior art.

Briefly, the objects of the invention are to provide a belt tracking and supporting system which: maintains an endless belt in running alignment with a straight line path of travel centered with respect to a supporting framework to prevent rubbing and wear of the belt thereagainst; is of simplified design and rugged construction to reduce time and costs of maintenance; is particularly adapted for use in a field-going hay baler wherein the belt is frequently subjected to non-uniform loading which tends to misalign the belt, and wherein the tracking and supporting system is subject to vibrations, shock loads, dust and debris associated with field-going operation; and which increases usable belt life beyond that of known systems in baler applications.

BRIEF DESCRIPTION OF THE DRAWINGS

FIG. 1 is a perspective view of a hay baler incorporating the improved belt tracking and support system of the invention;

FIG. 3 is a schematic view of the baler showing the overall operation;

FIG. 4 is a fragmentary sectional view of the lower belt tracking and support system taken generally along lines 4—4 of FIG. 2;

FIG. 5 is an enlarged fragmentary sectional view taken generally along lines 5—5 of FIG. 2; and FIG. 6 is a fragmentary enlarged side elevation view of a portion of the lower belt tension assembly.

DESCRIPTION OF THE PREFERRED EMBODIMENT

Figure 2:
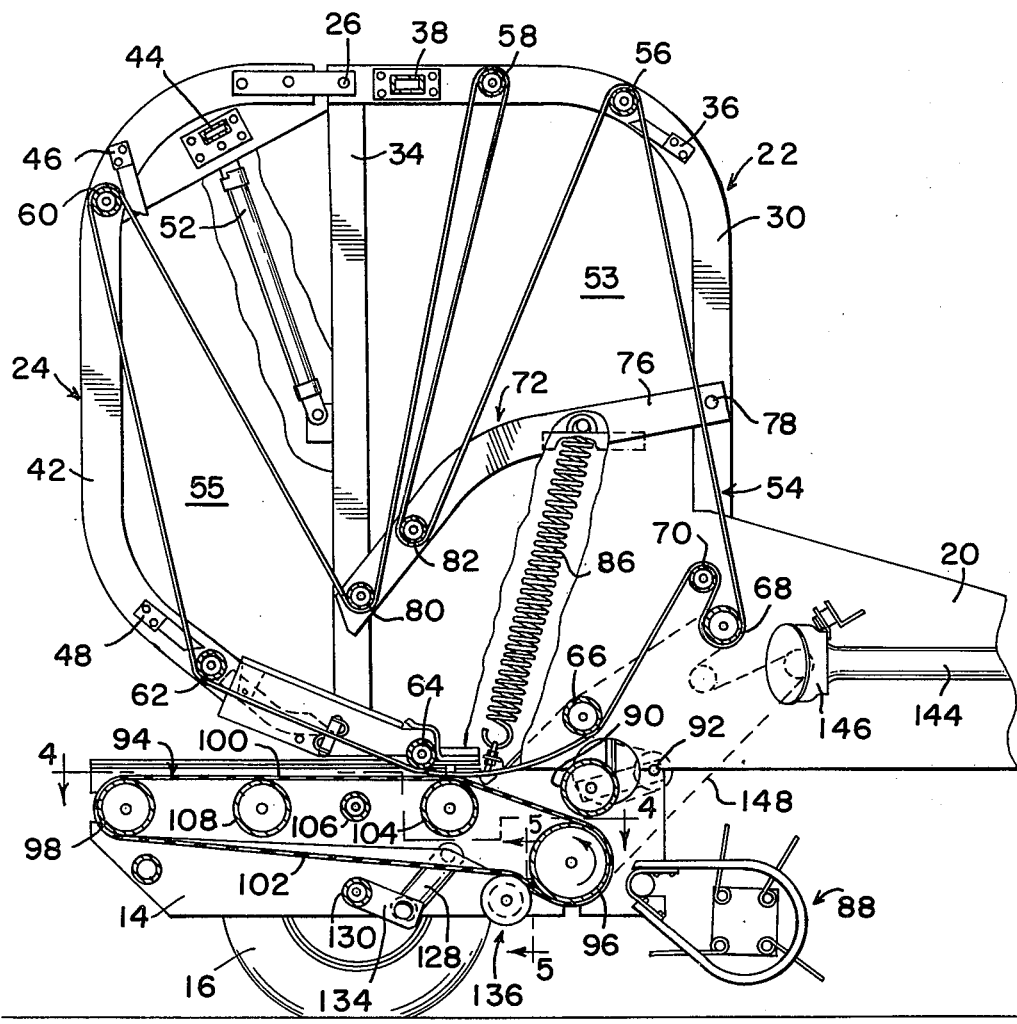
FIG. 2 is a fragmentary sectional side elevation taken generally along the longitudinal centerline of the baler of FIG. 1.

Referring first to FIG. 1 there is shown a baler having a rigid frame 10 including a pair of transversely spaced side frame members 12 and 14 (FIG. 4) extending parallel to the centerline of the frame. The frame 10 is supported on wheels 16 for towing behind a tractor (not shown) coupled to a hitch 18 on the front of a forwardly converging tongue structure 20 secured rigidly to the frame.

Projecting above the side frame members 12 and 14 is a superstructure comprising a fixed framework 22 and a gate structure 24 mounted on the framework 22 for pivotal movement about a pivot connection 26. The framework 22 includes a pair of generally C-shaped frame members 28 and 30 projecting upwardly from the side frame members 12 and 14 respectively. Vertical frame members 32 and 34 are secured to the side frame members 12 and 14 respectively and extend straight upwardly into rigid connection with the members 28 and 30. Suitable cross-bracing for the framework 22 is shown at 36 and 38 connected between the members 28 and 30.

The pivotable gate structure 24 includes a pair of generally C-shaped side frame members 40 and 42 interconnected rigidly by suitable cross bracing shown at 44, 46, and 48 in FIG. 2. Hydraulic piston-cylinder units 50 and 52 are connected between the fixed framework 22 and the gate 24 on the opposite sides of the baler for raising and lowering the gate about the pivot connection 26. In practice the sides of the framework 22 and gate 24 are closed by respective pairs of side sheets 53 and 55.

A plurality of endless bale-forming belts 54 are disposed in spaced parallel relation across the width of the framework 22 and gate 24. The belts 54 are trained on support rollers 56 and 58 on the framework 22, support rollers 60, 62, and 64 on the gate 24, and drive rollers 66 and 68 and an idler roller 70 on the framework 22. The extent of the belts 54 between the gate-mounted roller 64 and the framework-mounted drive roller 66 constitutes an upwardly expansible upper parameter of a bale-forming zone.

The belts 54 are retained in a taut condition about a bale being formed by a belt tightener assembly 72. The assembly 72 includes a pair of rigidly interconnected arms 74 and 76 pivotally mounted at a connection 78 on the frame members 28 and 30. A pair of belt tightening rollers 80 and 82 are journaled on the arms 74 and 76 in engagement with the belts 54 as shown in FIG. 2. Elongated coil springs 84 and 86 are connected between the arms 74 and 76 and the baler frame 10 for urging the assembly downwardly about the pivot connection 78.

The baler includes a hay pickup unit 88 of conventional construction pivotally connected to the forward end of the baler frame 10 for picking up windrowed hay from the ground and feeding it rearwardly. A press roller 90 is journaled rearwardly and above the pickup 88 and is spring biased downwardly about a pivot connection 92 for pressing the incoming hay into a mat of greater density.

In accordance with the invention the baler includes a lower endless belt 94 operable in conjunction with a novel tracking and supporting system therefor. The belt is trained on a forward drive roller 96 and a rearward tightener roller 98, both journaled on the side frame members 12 and 14. The belt 94 extends between the rollers 96 and 98 in an upper bale-supporting run 100 and a lower return run 102. A series of support rollers 104, 106, and 108 are journaled on the frame 10 beneath the upper run 100 so as to support the same as a bale is formed thereon.

The tightener roller 98 is biased toward the rear of the baler to keep the belt 94 taut by two spring assemblies shown generally at 110 and 112 in FIG. 4. The details of the spring assembly 110 are shown in FIG. 6, the assembly 112 being identical. The end of the roller 98 is journaled within a bearing unit 114 which is slidably received in a rearwardly opening slot 116 defined in the side frame member 12. A threaded rod 118 is secured to the bearing unit 114 and extends forwardly through a bracket 120 bolted to the side frame member 12. A coil spring 122 is disposed over the rod 118 between the bracket 120 and a nut and washer assembly 124 secured on the rod 118. It will be seen that the spring 122 exerts a force tending to move the roller 98 rearwardly. The bracket 120 is sized to permit limited transverse shifting of the roller 98.

The belt 94 is driven such that the return run 102 moves forwardly and toward the right as viewed in plan in FIG. 4. A pair of guiding or troughing rollers 126 and 128 is disposed in engagement with the underside of the return run 102. The rollers 126 and 128 are disposed in a V-configuration as viewed in plan (FIG. 4) and in transverse section (FIG. 5) to direct the lower run 102 into a trough-like transverse configuration as the lower run moves forwardly thereacross. A cross brace 130 is secured to the frame members 12 and 14. Bearing flanges 132 and 134 project forwardly from the cross brace 130 on opposite sides of the frame centerline for supporting the inner ends of the respective rollers 126 and 128. The outer ends thereof are journaled in suitable bearings in the frame members 12 and 14 respectively forwardly of the inner ends in the direction of travel of the lower run.

Disposed forwardly of the troughing rollers 126 and 128 and adjacent to the driving roller 96 is a compensating roller 136. The roller 136 includes a central cylindrical portion 138 symmetrically astride the frame centerline and opposite end portions 140 and 142 tapering outwardly from the central portion 138. The roller 136 engages the trough-configured underside of the lower run 102 and reconfigures the run into a transversely flat surface as uniformly received onto the drive roller 96.

The various components of the baler are adapted to be power driven from the towing tractor through a system including a PTO shaft 144, a right-angle gearbox 146, and a chain shown in dotted lines at 148 in FIG. 2. The chain 148 is adapted to drive the upper belt drive rollers 66 and 68 and the lower belt drive roller 96. Suitable chain drives are effected to the press roller 90 and the pickup 88.

The overall operation of the baler will be apparent with reference to FIG. 3 wherein the hay is picked up by the pickup 88 and fed under the press roller 90 onto the belt 94. The upper belts are driven by the drive rollers 66 and 68 in an opposite direction causing the hay to roll onto itself. As the bale size grows the tightener assembly 72 pivots upwardly and the gate 24 swings rearwardly. Upon completion of the bale the cylinder units 50 and 52 are hydraulically extended to raise the gate 24 to a full open position permitting the belt 94 to expel the bale rearwardly onto the ground.

During the formation of the bale it frequently happens that the incoming hay will be deposited on the belt 94 non-uniformly across its width. The resulting non-uniform loading tends to shift the belt away from the desired straight-line path of travel. This movement is resisted by the troughing effect provided by the rollers 126 and 128 on the lower run 102. The compensating roller 136 receives the troughed belt and transforms the trough for engagement onto the cylindrical drive roller 96 with a flat uniform gripping engagement along the length of the drive roller. More specifically, since the outer edges of the belt are raised in the trough configuration, the tapered ends 140 and 142 of the roller 136 permit the edges to be lowered correspondingly. Thus, the travel path length of every transversely spaced longitudinal section of the belt will be maintained by equal length.

By the foregoing Applicants have provided a support and tracking system for a lower belt adapted for use in a baler, which system is well suited in fulfilling the objects of the invention.

What is claimed is:

1. In a baler having an endless drivable belt upon which an incoming stream of hay is adapted to be rolled into a cylindrical bale, a support and tracking system for the belt comprising:
   a generally horizontal frame extending fore-and-aft of the baler;

a power-drivable roller journaled on a forward portion of said frame;

a tightener roller journaled on a rearward portion of said frame, said belt being trained about said rollers so as to be disposed therebetween in upper and lower runs, said drivable roller being adapted to move said lower run in a forward direction;

a pair of guiding rollers journaled on said frame in a V-configuration relative to each other as viewed in transverse vertical section and in horizontal plan to engage and support said lower run in a transverse trough-like configuration, thereby maintaining said belt in centered relation on said driving and tightening rollers;

a compensating roller journaled on said frame in engagement with said lower run between said guiding rollers and said drivable roller, said compensating roller having a cylindrical central portion and outwardly tapered end portions for engaging the troughed lower run as received from said guiding rollers to dispose the lower run uniformly into contact with said drivable roller.

2. The subject matter of claim 1, wherein said guiding rollers are disposed with their respective outer ends forwardly of their respective inner ends in the direction of travel of the lower run.

3. The subject matter of claim 1, including means biasing said tightener roller for movement on said frame to maintain said belt in taut condition.

4. A tracking and supporting system for an endless drivable belt, comprising:

a framework having a longitudinal centerline;

a pair of parallel rollers journaled on said framework at right angles to said centerline;

an endless flat belt trained over said rollers so as to extend therebetween in an upper flat run and a lower return run;

and roller means on said framework in rolling engagement with only the underside of said lower run for maintaining the belt in running alignment with said centerline, said roller means including a pair of guiding rollers disposed symmetrically from said centerline defining a V-configuration as viewed in plan and in transverse section so as to guide the lower run into a trough-like configuration tending to maintain the belt in running alignment with said centerline, one of said parallel rollers constituting a driving roller for the belt, said roller means further including a compensating roller journaled on said framework in proximity to said driving roller, said compensating roller having a central cylindrical portion symmetrically astride said framework centerline and opposite ends tapering outwardly from said cylindrical portion for rollably engaging the trough-like lower run received from said guiding rollers and reconfiguring said lower run for uniform engagement onto said driving roller.

5. A tracking and supporting system for an endless drivable belt, comprising:

a framework having a longitudinal centerline;

a pair of parallel rollers journaled on said framework at right angles to said centerline;

an endless flat belt trained over said rollers so as to extend therebetween in an upper flat run and a lower return run;

and roller means on said framework in rolling engagement with only the underside of said lower run for maintaining the belt in running alignment with said centerline, said framework including a pair of spaced parallel side frame members extending longitudinally of the framework parallel to said centerline, and a cross brace extending transversely between said side frame members;

said roller means including first and second belt guiding rollers on respective opposite sides of said centerline, said guiding rollers having respective inner ends supported from said cross brace and respective outer ends journaled on said side frame members, said guiding rollers being disposed in a V-configuration as viewed in plan and in transverse section to direct the lower run into a trough-like transverse configuration as the lower run moves thereacross, whereby the belt is guided to move in alignment with the framework centerline, one of said parallel rollers constituting a driving roller for the belt, said roller means further including a compensating roller journaled in said side frame members and disposed between said guiding rollers and said driving roller, said compensating roller including a central cylindrical portion and outwardly tapered ends flanking said cylindrical portion for reshaping the trough-like lower run as received from said guiding rollers into a configuration for uniform engagement with said driving roller.

6. In a baler having an endless drivable belt upon which an incoming stream of hay is adapted to be rolled into a cylindrical bale, a support and tracking system for the belt, comprising:

a framework;

a power-drivable roller journaled on said framework;

an idler roller journaled on said framework and parallel with said power-drivable roller, said belt being trained on said rollers so as to extend therebetween in an upper load-supporting flat run and a lower return run, said lower run having a direction of travel from said idler roller toward said power-drivable roller;

guiding rollers journaled on said framework engaging the underside of said lower run to direct the lower run into a transverse trough-like configuration facilitating centering of the belt on the framework;

and compensating roller means on said framework for reshaping the trough-like lower run into a configuration wherein the lower run engages said power-drivable roller uniformly to implement optimum driving forces of the power-drivable roller onto the belt.

7. The subject matter of claim 6, wherein said guiding rollers comprise a pair of elongated rollers disposed across the width of the belt in a V-configuration as viewed in plan and in transverse section.

8. In a baler adapted to be moved forwardly over the ground to roll an incoming stream of hay into a cylindrical roll upon an endless drivable belt, a support and tracking system for the belt comprising:

a generally horizontal rigid frame for the baler including spaced parallel frame members disposed longitudinally of the baler;

a drive roller journaled on said frame members toward the forward ends thereof;

a tightener roller journaled on said frame members toward the rearward ends thereof in parallel with said drive roller, said belt being trained on said rollers to extend therebetween in a rearwardly moving load-supporting upper run and a lower forwardly moving return run;

a pair of belt guiding rollers journaled on said frame in a V-configuration with the outer ends journaled on the respective frame members above and forwardly of the respective inner ends, said guiding rollers engaging the underside of said lower run to direct the same into a trough-like configuration for centering the belt on the frame;

and a compensating roller journaled on said frame members in parallel with said drive roller and disposed between said guiding rollers and said drive roller, said compensating roller including a central cylindrical portion and outwardly flanking tapered portions engageable with the trough-like configured lower run to redirect the same into a configuration receivable onto said drive roller.

9. In a baler adapted to be moved forwardly over the ground to roll an incoming stream of hay into a cylindrical roll upon an endless drivable belt, a support and tracking system for the belt, comprising:

a framework for the baler having a forwardly and rearwardly extending longitudinal centerline;

a pair of parallel rollers journaled on said framework at right angles to said centerline, said endless belt being trained over said rollers so as to extend therebetween in an upper bale-supporting run and a lower return run;

and belt centering means on said framework in rolling engagement with only the underside of said lower run for maintaining the belt in running alignment with said centerline thereby precluding misalignment of the belt induced by non-uniform distribution of hay on said upper run, said belt centering means including a pair of guiding rollers disposed symmetrically from said centerline and defining a V-configuration as viewed in plan and in transverse section to guide the lower run into a transverse trough-like configuration wherein the forces of engagement of the guiding rollers on the lower run tend to maintain the belt in running alignment with the framework centerline, one of said parallel rollers constituting a power-drivable roller for the belt, said belt centering means further including a compensating roller journaled between said guiding rollers and said power-drivable roller, said compensating roller being shaped to reconfigure the trough-like lower run as the lower run moves therepast for uniform engagement onto said power-drivable roller.

* * * * *